(12) United States Patent
Howland

(10) Patent No.: US 8,987,150 B2  
(45) Date of Patent: Mar. 24, 2015

(54) BREATHABLE CHEMBIO PROTECTION FABRIC WITH CARBON NANOTUBE PHYSICAL PATHOGEN BARRIER

(75) Inventor: Charles A. Howland, Temple, NH (US)

(73) Assignee: Warwick Mills Inc., New Ipswich, NH (US)

(*) Notice: Subject to any disclaimer, the term of this patent is extended or adjusted under 35 U.S.C. 154(b) by 802 days.

(21) Appl. No.: 12/986,252

(22) Filed: Jan. 7, 2011

(65) Prior Publication Data

US 2011/0123757 A1 May 26, 2011

Related U.S. Application Data

(63) Continuation-in-part of application No. PCT/US2010/057477, filed on Nov. 19, 2010.

(60) Provisional application No. 61/262,949, filed on Nov. 20, 2009, provisional application No. 61/310,389, (Continued)

(51) Int. Cl.
- *D04H 3/00* (2012.01)
- *B32B 5/26* (2006.01)

(Continued)

(52) U.S. Cl.
CPC . *B32B 33/00* (2013.01); *A62D 5/00* (2013.01); *B82Y 30/00* (2013.01); *D04H 1/4242* (2013.01);

(Continued)

(58) Field of Classification Search
CPC .... B82Y 40/00; B82Y 30/00; C01B 31/0226; C01B 31/0233; C01B 31/0206; C01B 31/022
USPC .............. 977/742–753; 442/85, 86, 123, 327, 442/334, 381; 2/455, 456, 457
See application file for complete search history.

(56) References Cited

U.S. PATENT DOCUMENTS

| 5,665,810 A | 9/1997 | Patchett et al. |
| 5,882,357 A | 3/1999 | Sun et al. |

(Continued)

FOREIGN PATENT DOCUMENTS

WO 2004044305 A1 5/2004

OTHER PUBLICATIONS

PCT Search Report for PCT Appl. No. PCT/US2012/000301, dated Feb. 5, 2013, 3 pages.

(Continued)

*Primary Examiner* — Matthew Matzek  
(74) *Attorney, Agent, or Firm* — Maine Cernota & Rardin (57) ABSTRACT

A fabric for use in chemical and biological (CB) protective garments includes at least one felt layer having from 25% to 100% carbon nanotube (CNT) fibers as a breathable physical barrier against toxic chemical droplets and/or pathogens. The felt layers are cleaned and consolidated into a mechanically competent sheet which can form adhesive seams having lap-shear greater than the sheet itself. An additional supporting layer can be included. The supporting layer can be a wicking layer which is permeable with a chlorinated or otherwise chemically active solution to establish a reactive chemical barrier, the solution being dispensed on demand from a portable container. Embodiments include a second layer of CNT or of another backing fabric, sandwiching the wicking layer therebetween. Impermeable fluoropolymer seams can divide the fabric into a plurality of CNT/wicking cells. A layer of activated charcoal and/or halamine-forming hydantoin can be included for persistent reactive chemical protection.

18 Claims, 9 Drawing Sheets

Related U.S. Application Data filed on Mar. 4, 2010, provisional application No. 61/354,588, filed on Jun. 14, 2010, provisional application No. 61/370,529, filed on Aug. 4, 2010, provisional application No. 61/293,791, filed on Jan. 11, 2010.

(51) Int. Cl.

| | | |
|---|---|---|
| *A62B 17/00* | (2006.01) | |
| *G21F 3/02* | (2006.01) | |
| *B32B 33/00* | (2006.01) | |
| *A62D 5/00* | (2006.01) | |
| *B82Y 30/00* | (2011.01) | |
| *D04H 1/4242* | (2012.01) | |
| *D04H 1/4391* | (2012.01) | |

(52) U.S. Cl.
CPC .......... *D04H 1/4391* (2013.01); *B32B 2305/28* (2013.01); *B32B 2307/7145* (2013.01); *B32B 2307/724* (2013.01); *B32B 2571/00* (2013.01); *Y10S 977/742* (2013.01); *Y10S 977/75* (2013.01); *Y10S 977/752* (2013.01)
USPC .......... 442/334; 442/327; 442/381; 977/742; 977/750; 977/752; 2/455; 2/456; 2/457

(56) References Cited

U.S. PATENT DOCUMENTS

| | | | |
|---|---|---|---|
| 5,959,014 | A | 9/1999 | Liebeskind et al. |
| 6,077,319 | A | 6/2000 | Sun et al. |
| 6,770,287 | B1 | 8/2004 | Sun et al. |
| 7,858,539 | B2 | 12/2010 | Li et al. |
| 2001/0055651 | A1 | 12/2001 | Mo et al. |
| 2002/0090872 | A1 | 7/2002 | Li |
| 2003/0159200 | A1 | 8/2003 | Elrod |
| 2005/0229327 | A1 | 10/2005 | Casella et al. |
| 2008/0104738 | A1* | 5/2008 | Conley et al. .................... 2/82 |
| 2009/0148637 | A1* | 6/2009 | Zhang et al. .................. 428/34.5 |
| 2010/0088827 | A1 | 4/2010 | Knott et al. |

OTHER PUBLICATIONS

Declaration of Dr. Gang Sun under 37 CFR 1.132 made in U.S. Appl. No. 09/596,808, dated Apr. 15, 2003, 10 pages.

Barnes, K. et al., Modification of Silica Gel, Cellulose, and Polyurethane with a Sterically Hindered N-Halamine Moiety to Produce Antimicrobial Activity, Journal of Applied Polymer Science, vol. 105, 2306-2313, 2007, 8 pages.

Sun, Y. et al., Durable and Regenerable Antimicrobial Textile Materials Prepared by a Continuous Grafting Process, Journal of Applied Polymer Science, vol. 84, 1592-1599, 2002, 8 pages.

PCT Search Report for PCT Application No. PCT/US2010/057477, Aug. 28, 2011, 2 pages Sun, Gang—National Textile Center, National Textile Center Annual Report: NTC Project C02-CD06 (formerly C02-E06), Nov. 2003, 6 pages.

Sun, G., Xu X., Bickett J. R., Williams J.F., (2001) "Durable and Regenerable Antimicrobial Finishing of Fabrics with a New Hydantoin Derivative," Ind. Eng. Chem. Res., vol. 40, 1016-1021.

Sun, G., Xu, X., "Durable and Regenerable Antibacterial Finishing of Fabrics: Biocidal Properties," Text. Chem. Color. 1998, 30 (6), 26-30.

Sun, G., Xu, X., "Durable and Regenerable Antibacterial Finishing of Fabrics: Chemical Structures," Text. Chem. Color. 1999, 31 (5), 31-35.

Williams, Jeffrey F. et al., Antimicrobial Functionality of Healthcare textiles: Current needs, Options, and Characterization of N halamine-Based Finishes, RJTA Vo. 10, No. 4, 2006, 12 pages.

* cited by examiner

BREATHABLE CHEMBIO PROTECTION FABRIC WITH CARBON NANOTUBE PHYSICAL PATHOGEN BARRIER

RELATED APPLICATIONS

This application is a continuation in part of PCT application PCT/US10/57477 filed on Nov. 19, 2010. PCT application PCT/US10/57477 claims the benefit of U.S. Provisional Application No. 61/262,949, filed Nov. 20, 2009, U.S. Provisional Application No. 61/310,389 filed Mar. 4, 2010, U.S. Provisional Application No. 61/354,588 filed Jun. 14, 2010, and U.S. Provisional Application No. 61/370,529 filed Aug. 4, 2010. This application also claims the benefit of U.S. Provisional Application No. 61/293,791, filed Jan. 11, 2010. All of these applications are incorporated herein by reference in their entirety for all purposes.

FIELD OF THE INVENTION

The invention relates to garments for protection against chemical and biological agents, and more particularly to fabrics that can be used in the manufacture of such garments.

BACKGROUND OF THE INVENTION

Personal protection equipment ("PPE"), including chemical and biological ("CB") protection equipment, is often used to protect an individual from exposure to dangerous chemicals and pathogens, for example in a medical environment, or when investigating a toxic chemical fire or biological spill. Such equipment can range from items which protect only the eyes, lungs, and extremities, such as, masks and gloves, to whole "suits" which completely enclose a user's body. Complete suits can be required, for example, when working in an area where toxic fumes are present, or in a military conflict where there has been a suspected release of toxic chemicals or pathogens by a terrorist or an enemy combatant.

The design, manufacture, and fielding of chemical and biological ("CB") protection equipment for soldiers and first responders is complex and costly. Typically, protective garments are manufactured from materials which are completely impenetrable to air, and thereby block all exchange of moisture. While this approach provides chemical and biological protection, long term use can cause significant irritation and overheating of protected areas due to heat and moisture buildup. In the case of a protection suit which encloses a user's entire body, usage can be limited to very short durations, due to the buildup of heat and moisture within the garment and the resulting danger of user overheating and heat stroke.

One approach is to include an air circulation system and/or cooling system with the protective garment, but this adds cost, energy requirements, and weight to the garment, and can impair the mobility and movement flexibility of the user.

A January 2008 study by the Commission of the National Guard and Reserves concluded that the United States military's readiness to respond to a chemical, biological, or nuclear weapons attack showed "an appalling gap that places the nation and its citizens at greater risk." First responders are limited to only 2.5 hours of effective performance while wearing typical CB-protective garments currently in use, due to the debilitating heat stress caused by the air and moisture impermeability of these CB-protective garments. For regular Army and Marines, JLIST ("Joint services Lightweight Integrated Suit Technology") suits are a significant step forward, but remain significantly heavy and continue to pose serious heat stress issues.

What is needed, therefore, is a fabric from which CB-protective items can be manufactured at lower cost and decreased logistical demand, whereby the fabric will deliver effective chemical and biological agent protection while providing low weight and heat-stress management for longer usage times.

SUMMARY OF THE INVENTION

The present invention is a breathable textile for use in reactive chemical and biological (CB) protective garments which incorporates a physical CB barrier containing at least 25% carbon nanotube (CNT) fibers, so as to inhibit penetration by liquid droplets and pathogens while providing a moisture vapor transport rate (MVTR) which is sufficient to avoid undue heat stress to the user.

In some embodiments, the physical barrier includes at least one layer of CNT felt or mat. CNT felt is an exceptionally high-performance filter material which creates a physical barrier to pathogens and aerosolized agents. Textile laminated CNT felts are both breathable and resistant to pathogen penetration. Production of CNT felt raw materials has begun at a number of facilities, supported in part by the United States Department of Defense. Typically, however, such materials are not mechanically competent to be used as a garment fabric. This lack of competency is largely due to contaminants mixed with the CNT material which interfere with adhesion between nanotubes.

CNT nano-fiber production methods typically result in byproduct contaminates that reside on the fiber surfaces. In particular, CNT felts typically include residual concentrations of starting materials such as alkanes and alkenes from which the nanotubes are formed. Upon termination of the nanotube forming process, these residual molecules adhere to the nanotubes and interfere with direct adhesion between the nanotubes.

In some embodiments of the present invention these contaminates are removed using one or more cleaning methods before the final consolidation of the barrier felt into a consolidated CNT sheet which has mechanical strength and chemical stability sufficient for incorporation into a CB protective garment. In some cases, a plurality of CNT sheets are laminated together so as to form a laminated sheet. Removal of the contaminants in these embodiments is also needed so as to provide sufficient inter-laminar adhesion.

The mechanical properties of these novel CNT sheets are such that adhesive seams formed from the sheets have a lapshear which is higher than the sheet itself, so that when two pieces of the sheet are joined by a properly formed adhesive seam and are subjected to a tensile strength test, the seam is not the region of eventual failure.

In various embodiments, the cleaning process includes one or more of thermal cleaning, cleaning by acids and other solvents, and plasma cleaning using for example an argon plasma. In some embodiments, a solvent having a viscosity less than toluene is applied to the felt in combination with high energy ultrasonic energy so as to ensure penetration and cavitation of the solvent within the CNT felt.

The process for manufacture of high strength nano-fiber felt for some embodiments of the present invention includes the following steps:

CNT nano-fiber production;

Cleaning steps;

Nano-fiber lay-down-mat formation;

Cleaning steps;
Coating application to clean unconsolidated mat with control of MVTR; and
Mat consolidation (some embodiments include application of temperature and pressure)

Other embodiments of the present invention include a flexible barrier layer assembly comprising a multi-ply non-woven, mechanically competent barrier layer including at least 25% CNT nano-fibers. In some of these embodiments, the barrier layer has hydrostatic resistant greater than 3 cm of water column. In some embodiments, the nano-fiber layers retain sufficient porosity to deliver MVTR of 0.2 mg/cm$^2$/min, which is sufficient for most CB and PPE protective garments to be comfortable, and some embodiments deliver 0.6 mg/cm$^2$/min. In various embodiments, the nano-fiber has high L/d ratio, the lay-down entanglement is high, and the processed mat has enough adhesive coating to prevent inter-layer de-lamination, and enough topcoat to prevent abrasion and puncture failure, while preserving these high levels of MVTR.

In various embodiments, the pathogen barrier layer has high mechanical strength both in tensile and in puncture, even though such pathogen barrier layers have typical area densities of 10-20 g/m$^2$. In certain embodiments, a process of fiber cleaning, fiber lay-ply-down, and fiber ply adhesive consolidation using van-der-Waal forces, hydrogen bonding, and/or London forces results in a barrier layer tensile strength greater than 100 g/25 mm/g/m2

In certain embodiments the barrier layer provides properties of:
Tensile strength 1 kg/25 mm/20 g of basis weight, where specific tensile strength is calculated by dividing the strength in grams of force per 25 mm strip by the mass-per-square meter in grams:
puncture resistance of 600 gr-5000 gr; and
MVTR greater than 0.2-0.10 mg/cm$^2$/min.

Embodiments use high tenacity CNT nano-fiber materials so as to perform at this level in a random oriented mat. It is believed that the length-to-diameter ratio of the CNT nano-fiber is very important to this mechanical performance. Some embodiments of the present invention include CNT nano-fibers having a length-to-diameter (L/d) ratio in a range of about 1 to 40 million.

In various embodiments, the pathogen barrier layer includes the following strata:
First CNT membrane layer;
Fiber support layer; and
Second CNT membrane layer (to improve durability and pathogen protection)

Embodiments of the present invention combine the inherent breathability and chemical and pathogen physical resistance of at least one physical barrier comprising at least 25% CNT fibers with a reactive chemical barrier layer that uses on-demand activated aqueous chemistry to protect against liquid and vapor chemical agents. In some of these embodiments, the physical barrier layer includes at least one layer of CNT felt. The reactive chemical barrier can be activated on demand by distribution of the aqueous chemistry through a wicking textile layer cooperative with the CNT felt layer or other physical barrier layer. In embodiments, the activated aqueous chemistry is aqueous halogen chemistry, such as aqueous chlorine chemistry. Note that the terms "chlorine chemistry" and "chlorinated" are used throughout this document to refer generically to halogen chemistry and to "halogenated," unless the context requires a specific reference to chlorine.

Aqueous chlorine chemistries are effective against TICs, TIMs and chemical agents, and CNT felts are unaffected by these chlorinated solutions. This is significant, as all current CB barrier membranes currently used in protective garments are incompatible with chlorine.

Embodiments of the present invention can be rapidly activated by distributing a chlorinated solution through the wicking layer so as to provide reactive chemical protection in combination with the physical protection of the CNT layer. Because the chemical protection is "on demand," the reactive properties are not consumed when not needed, such as during user training and inspection. Instead, the fabric of the present invention can be activated with a chlorinated solution only when needed, thereby avoiding the shelf life, use life, and other logistical issues inherent in current charcoal-based systems.

In some embodiments, a layer of CNT material is cooperative with a layer of wicking material and a backing layer. In other embodiments, a "sandwich" configuration is employed whereby the wicking layer is "sandwiched" between two layers of CNT material. In various embodiments, the chlorinated solution can be transferred into the wicking layer from a portable reservoir by a manual or electric pump, by gravity feed through an openable valve, or by other means known in the art.

Certain embodiments include a layer of activated charcoal and/or hydantoin, the hydantoin being activated by the halogenated solution to form a layer of a halamine such as chloramine, which provides sustained reactive chemical protection even if the aqueous halogenated solution should evaporate, leak away, or otherwise be lost. In various embodiments, the hydantoin is attached to a surface of the wicking layer, to a surface of a pathogen barrier layer, to a surface of a backing layer, and/or to some other surface of the fabric which is in fluid communication with the wicking layer. In some embodiments, the layer of halamine is of sufficient concentration to provide a maximum 90 second 3-log kill rate for at least *S. aureus* ATCC strain #6538 and *E. coli*, as determined by an aerosol AATCC Method 100 assessment.

Amide forms of hydantoin are used in some embodiments so as to provide free chlorine concentrations of up to approximately 1-2 ppm, while also providing long usage times. In other embodiments, halamine formed from an imide form of hydantoin such as 1,3-dimethylol-5 5-dimethylhydantoin (also referred to herein as "DMDMH") is used, either alone or in combination with amide and/or other forms of hydantoin. Imide forms of hydantoin have lower binding energy to chlorine and other halogen ions than amide forms, and can result in up to five times higher levels of free halogen at a textile surface, i.e. up to 10 ppm. Embodiments provide attached halamine concentrations of up to 6,000 ppm, or even 10,000 ppm, thereby providing usage times of 80 to 400 hours.

One general aspect of the present invention is a nanofiber sheet suitable for incorporation into a chemical and biological (CB) protective garment. The nanofiber sheet includes at least one felt of nanofibers. The nanofibers include at least 25% carbon nanotube (CNT) fiber, the at least one felt is able to inhibit penetration of toxic chemical droplets and/or pathogens, and the at least one felt is consolidated into a sheet having sufficient mechanical strength to enable formation of an adhesive seam between two such sheets wherein the seam has a lapshear greater than a shear strength of the sheet itself.

In certain embodiments the felt of nanofibers is a CNT felt having substantially 100% carbon nanotube fibers. In some embodiments, the nanofiber sheet has a hydrostatic resistance of greater than 3 cm of water column. In various embodiments the nanofiber sheet has a water vapor transport rate (WVTR)

of greater than 0.2 mg/cm2/min. And in other embodiments the nanofiber sheet has a tensile strength greater than 100 g/25 mm/g/m2.

Another general aspect of the present invention is a method for producing a carbon nanotube (CNT) sheet suitable for incorporation into a chemical and biological (CB) protective garment. The method includes providing a CNT felt, cleaning the CNT felt, and consolidating the CNT felt into a CNT sheet, the CNT sheet having sufficient mechanical strength to enable formation of an adhesive seam between two such sheets, wherein the seam has a lapshear greater than a shear strength of the sheet itself.

In various embodiments, cleaning includes at least one of thermal cleaning, chemical cleaning, and plasma cleaning. In other embodiments cleaning includes simultaneous application of a solvent and of ultrasonic energy to the CNT felt, the solvent having a viscosity less than toluene.

In some embodiments providing the CNT felt includes providing CNT fiber, cleaning the CNT fiber, and laying down the CNT fiber so as to form the CNT felt.

Still another general aspect of the present invention is a fabric for constructing garments which protect a user from exposure to at least one of toxic chemical droplets and pathogens. The fabric includes a first physical barrier layer which is able to inhibit penetration by at least one of toxic chemical droplets and pathogens, the first physical barrier layer being a non-woven nanofiber sheet including at least 25% carbon nanotube (CNT) fibers. The fabric further includes a supporting layer which is physically cooperative with the first physical barrier layer and configured to provide physical support to the first physical barrier layer.

In some embodiments, the nanofiber sheet is a CNT sheet including substantially 100% carbon nanotube fibers.

Certain embodiments further include a second physical barrier layer which is able to inhibit penetration by at least one of toxic chemical droplets and pathogens, the second physical barrier layer being a non-woven nanofiber sheet including at least 25% carbon nanotube fibers, the supporting layer being sandwiched between the first physical barrier layer and the second physical barrier layer. And in some of these embodiments the nanofiber sheet of the second physical barrier layer is a CNT sheet including substantially 100% carbon nanotube fibers.

Various embodiments further include a plurality of impermeable seams joining a plurality of first physical barrier layers to the supporting layer so as to divide the fabric into separated regions containing physical barrier layers, the separated regions being joined by the impermeable seams. And in some of these embodiments the impermeable seams are made from a fluoropolymer.

In various embodiments the supporting layer is a wicking textile layer cooperative with the first physical barrier layer, the wicking textile layer being configured so as to distribute a reactive chemical throughout the wicking textile layer, thereby forming a reactive chemical barrier layer which is cooperative with the first physical barrier layer, the fabric further including a backing layer cooperative with the wicking textile layer and configured so as to locate the wicking textile layer between the first physical barrier layer and the backing layer. In some of these embodiments the backing layer is a layer of Nomex (flame-resistant meta-aramid).

In certain of these embodiments the backing layer is a second physical barrier layer which is able to inhibit penetration by at least one of toxic chemical droplets and pathogens, the second physical barrier layer being a non-woven nanofiber sheet including at least 25% carbon nanotube fibers, the wicking textile layer being sandwiched between the first physical barrier layer and the second physical barrier layer. And in some of these embodiments the second physical barrier layer is a CNT sheet including substantially 100% carbon nanotube fibers.

Other of these embodiments further include a plurality of impermeable seams joining a plurality of first physical barrier layers to a plurality of backing layers, thereby dividing the fabric into a plurality of separated regions in each of which a wicking textile layer is configured between a first physical barrier layer and a backing layer.

Various of these embodiments further include a layer of hydantoin attached to a surface of the fabric and at least in fluid communication with the wicking textile layer. In some of these embodiments the layer of hydantoin is applied to a surface of the backing layer. In other of these embodiments the layer of hydantoin is applied to the wicking textile layer.

Yet another general aspect of the present invention is a chemically and biologically protective garment system, which includes a first carbon nanotube felt layer configured to provide a protective physical barrier against at least one of toxic chemicals and pathogens, a wicking textile layer cooperative with the first carbon nanotube felt layer, the wicking textile layer being configured so as to receive a chemically reactive solution and distribute the chemically reactive solution throughout the wicking textile layer, thereby forming a protective reactive chemical barrier cooperative with the first carbon nanotube felt layer, a portable container configured for containment of the chemically reactive solution, and a solution delivery mechanism which is able to extract the reactive chemical solution from the portable container and deliver it to the wicking textile layer.

In various of these embodiments, the solution delivery mechanism includes a mechanically operated pump, an electrically operated pump, and/or an openable valve.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is a fabric that can be used for manufacturing chemically and biologically protective garments and other CB-protective apparatus. The fabric includes at least one physical chemical and pathogen barrier layer which includes at least 25% Carbon NanoTube (CNT) fiber that provides mechanical strength, breathability and physical protection against pathogens and aerosolized chemical droplets. In some embodiments, the pathogen barrier layer includes a layer of CNT felt.

Figure 1:
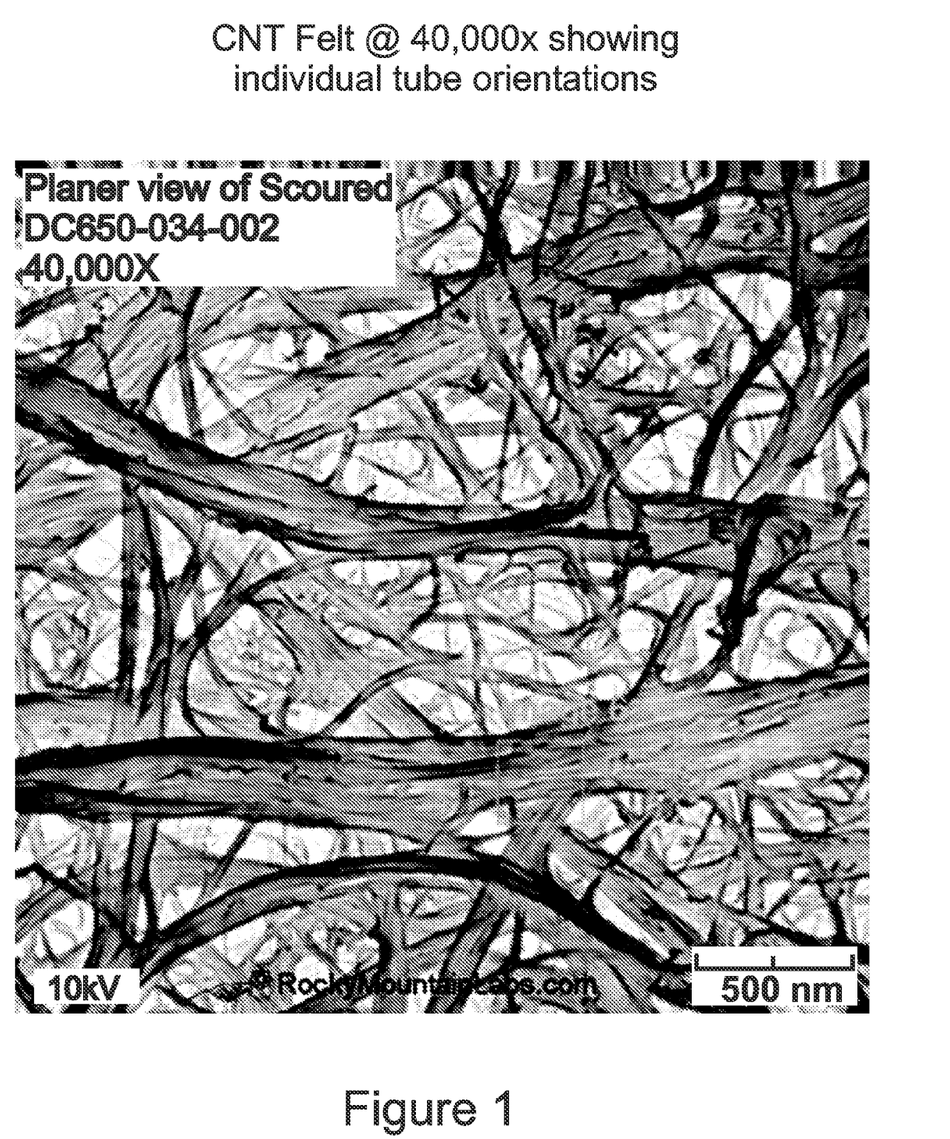
FIG. 1 is a magnified view of the fiber structure of a CNT felt used in embodiments of the present invention.
Figure 2:
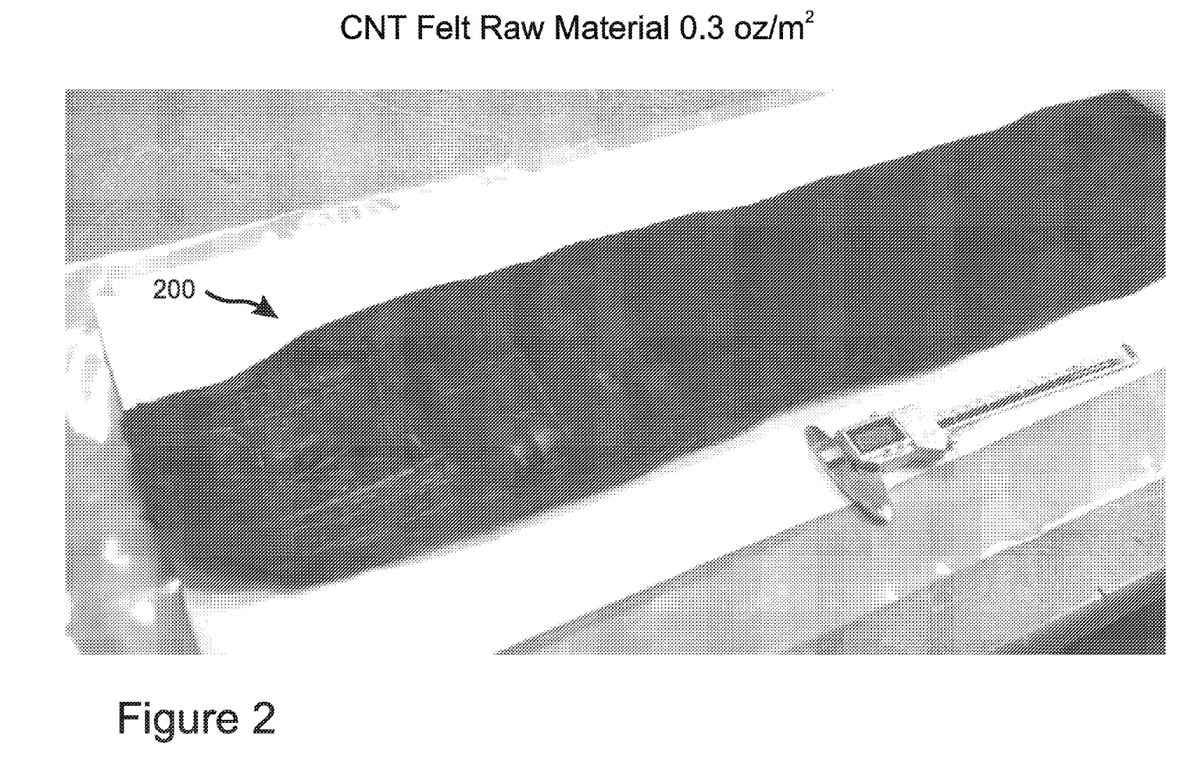
FIG. 2 is a perspective view of a sheet of CNT felt raw material used in embodiments of the present invention.

As illustrated in the magnified view of FIG. 1, the nano-size pore structure of CNT felt materials allows permeation of only a modest level of a chemical agent vapor. As illustrated in FIG. 2, CNT felt 200 is available in sizable sheets with low weight (0.3 oz/$m^2$ in the example shown in the figure).

CNT felt samples 200 such as the one shown in FIG. 2 have been tested using ASTM F-1671, which is a standard test method for resistance of materials used in protective clothing to penetration by blood-borne pathogens using phi-X174 bacteriophage penetration as a test system. This test method measures the resistance of materials used in protective clothing to penetration by blood-borne pathogens using a surrogate microbe under conditions of continuous liquid contact at 2 psi. Protective clothing material pass/fail determinations are based on the detection of viral penetration. All of the tested CNT felt samples passed this test, suggesting that aerosol particles of biological agents will not penetrate the CNT felt layer of the present invention.

Figure 3:
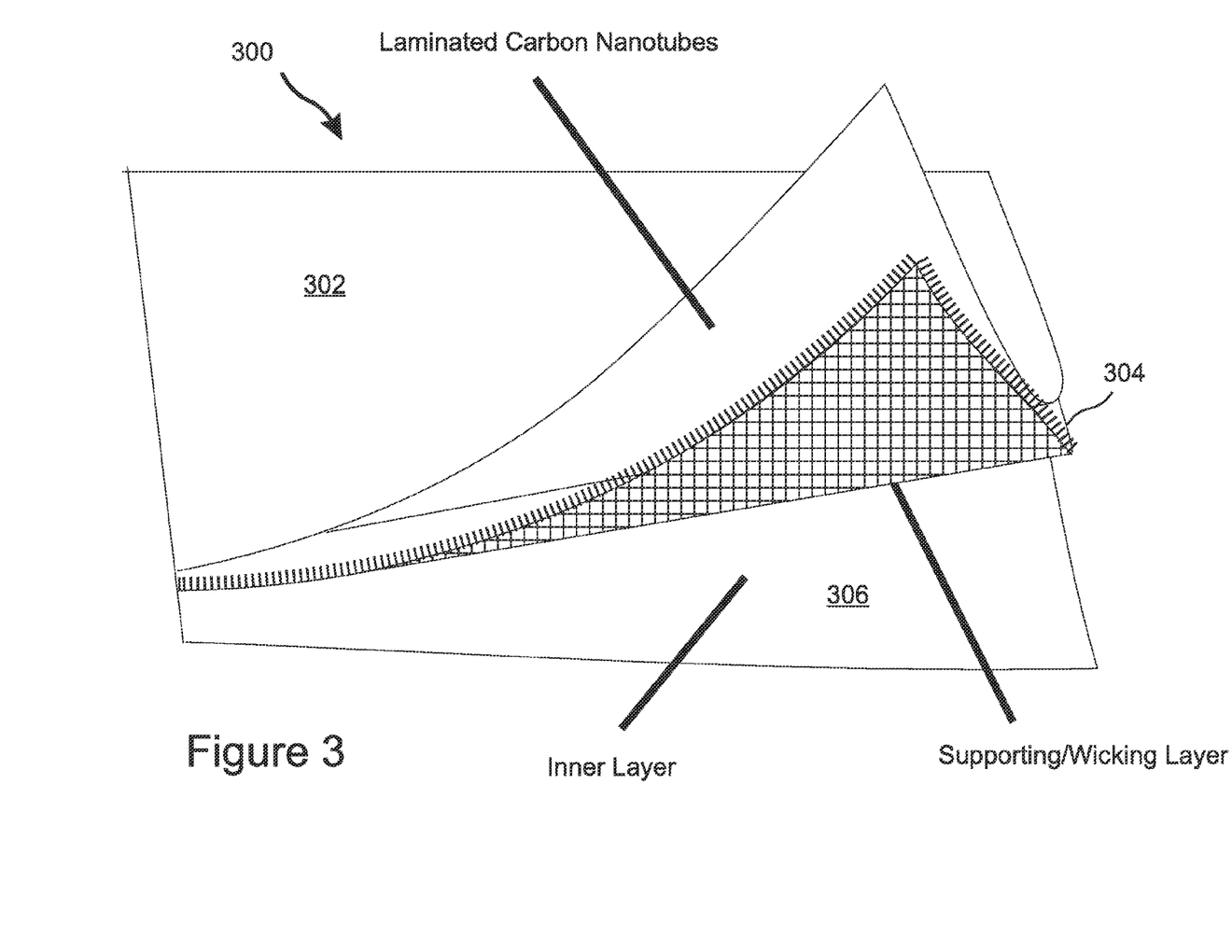
FIG. 3 is a perspective view of a three-layer embodiment having a supporting layer such as a wicking layer sandwiched between a laminated CNT layer and an inner layer.

With reference to FIG. 3, embodiments of the present invention include a supporting layer 304 which is physically cooperative with the CNT layer and increases the mechanical strength and durability of the CNT physical barrier layer 302. In the embodiment 300 of FIG. 3, the supporting layer 304 is sandwiched between two CNT barrier layers 302, 306.

In various embodiments, the fabric 300 of the present invention includes at least CNT physical barrier layer such as a layer of CNT felt 302 which is cooperative with a layer of wicking textile 304, this wicking layer 304 being sandwiched between the CNT layer 302 and an inner layer 306. The wicking textile 304 can support a chemically reactive layer so as to provide chemical protection against chemical and biological agents. The chemically reactive layer can be activated on demand by distributing a chlorinated solution through the wicking layer.

In some embodiments the inner layer 306 is another CNT barrier layer such as a layer of CNT felt. In the event of a chemical agent release or attack, a user wearing a garment made from the fabric 300 of one of these embodiments would activate the chemical protection of the garment by actuating a chemical dispensing mechanism, such as pushing the plunger of a syringe-type pump or similar device, activating an electric pump or similar device, or opening a valve in a gravity-fed configuration, so as to dispense a halogenated solution such as a chlorinated solution into the wicking textile layer 304 and thereby distribute the halogenated solution throughout the interior of the garment.

If the user did not have advance warning of the attack, the CNT layer 302 would provide initial protection while the chemical layer was being activated. Any residual vapor that somehow managed to penetrate through the CNT layer 302 would then be decomposed by the halogenated solution once the solution had wicked throughout the wicking layer 304.

In some embodiments, the inner layer 306 of FIG. 3 primarily serves to retain the chlorinated solution in the wicking layer. In some of these embodiments, the inner layer 306 is a Nomex (flame-resistant meta-aramid) layer. In other embodiments, the inner layer 306 is a second layer of CNT material, and in some embodiment more than two layers of CNT material are included. Certain embodiments include a layer of activated charcoal.

Figure 4A:
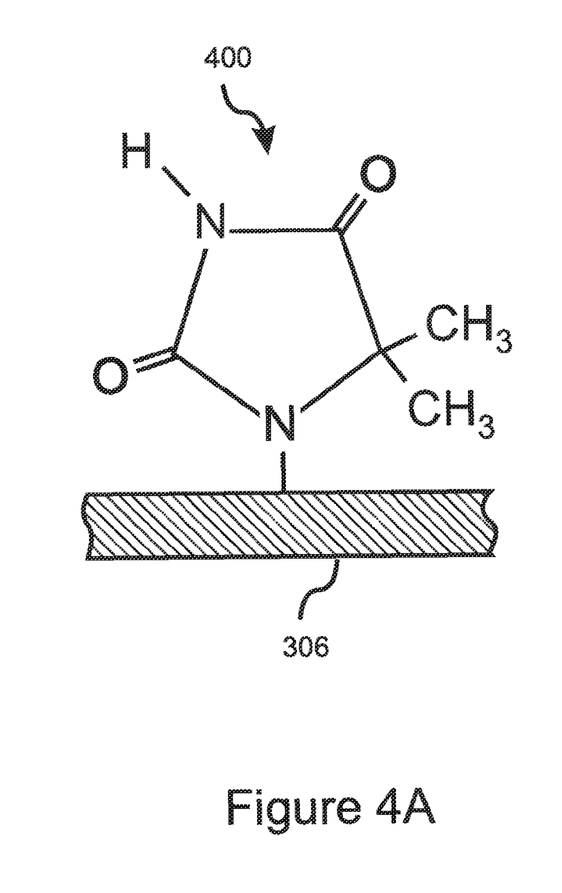
FIG. 4A is a functional diagram indicating the chemical structure of a hydantoin compound attached to a fabric layer surface.
Figure 4B:
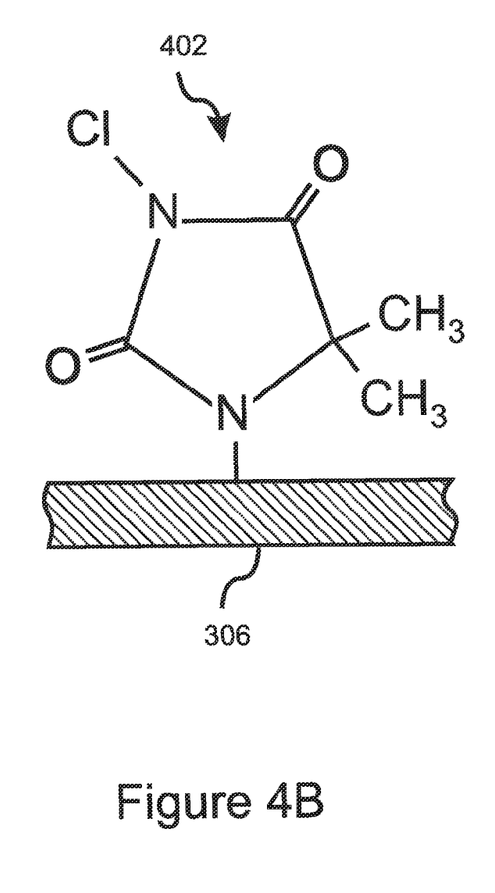
FIG. 4B is a functional diagram indicating the chemical structure of a chloramine compound formed by exposure of the hydantoin compound of FIG. 4A to chlorine.

With reference to FIGS. 4A and 4B, some embodiments include a layer of hydantoin 400 attached to the inner layer 306, or to another layer of the fabric and in fluid communication with the wicking layer 304. The hydantoin 400 is activated by the halogenated (e.g. chlorinated) solution to form a layer of halamine 402 which provides sustained reactive chemical protection even if the aqueous chlorinated solution should evaporate, leak, or otherwise be lost. In some of these embodiments, the layer of halamine 402 is of sufficient concentration to provide a maximum 90 second 3-log kill rate for at least *S. aureus* ATCC strain #6538 and *E. coli*, as determined by an aerosol AATCC Method 100 assessment.

Amide forms of hydantoin are used in some embodiments so as to provide free chlorine concentrations of up to approximately 1-2 ppm, while also providing long usage times. In other embodiments, halamine formed from an imide form of hydantoin such as 1,3-dimethylol-5 5-dimethylhydantoin (also referred to herein as "DMDMH") is used, either alone or in combination with amide and/or other forms of hydantoin.

Imide forms of hydantoin have lower binding energy to chlorine ions than amide forms, and can result in up to five times higher levels of free chlorine at a textile surface, i.e. up to 10 ppm. Embodiments provide attached halamine concentrations of up to 6,000 ppm, or even 10,000 ppm, thereby providing usage times of 80 to 400 hours.

Figure 4C:
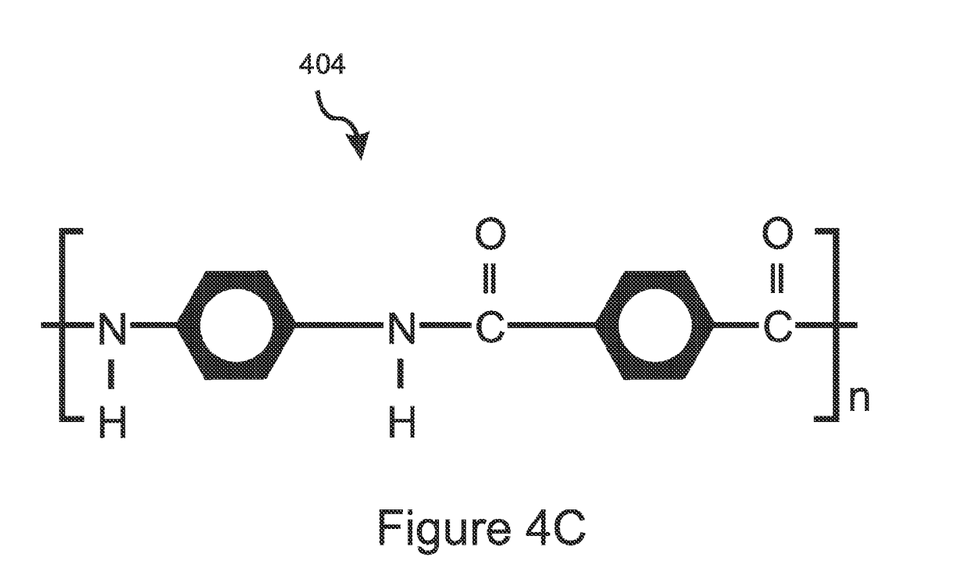
FIG. 4C is a diagram of the chemical structure of a meta-aramid polymer having inherent N—H groups, illustrated before exposure to chlorine.
Figure 4D:
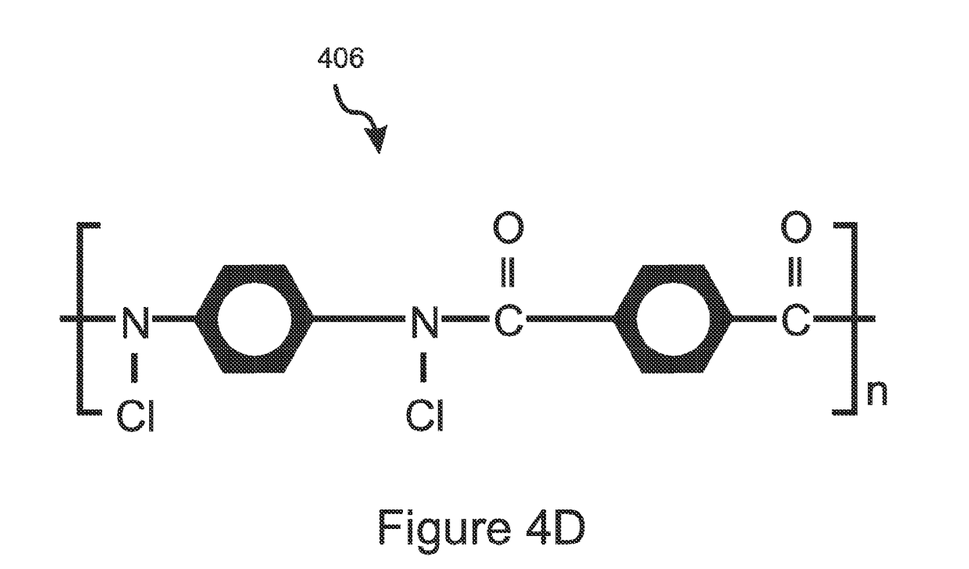
FIG. 4D is a diagram of the meta-aramid polymer of FIG. 4C after exposure to chlorine, wherein the N—H groups have been replaced by N—Cl chloramine groups.
Figure 4E:
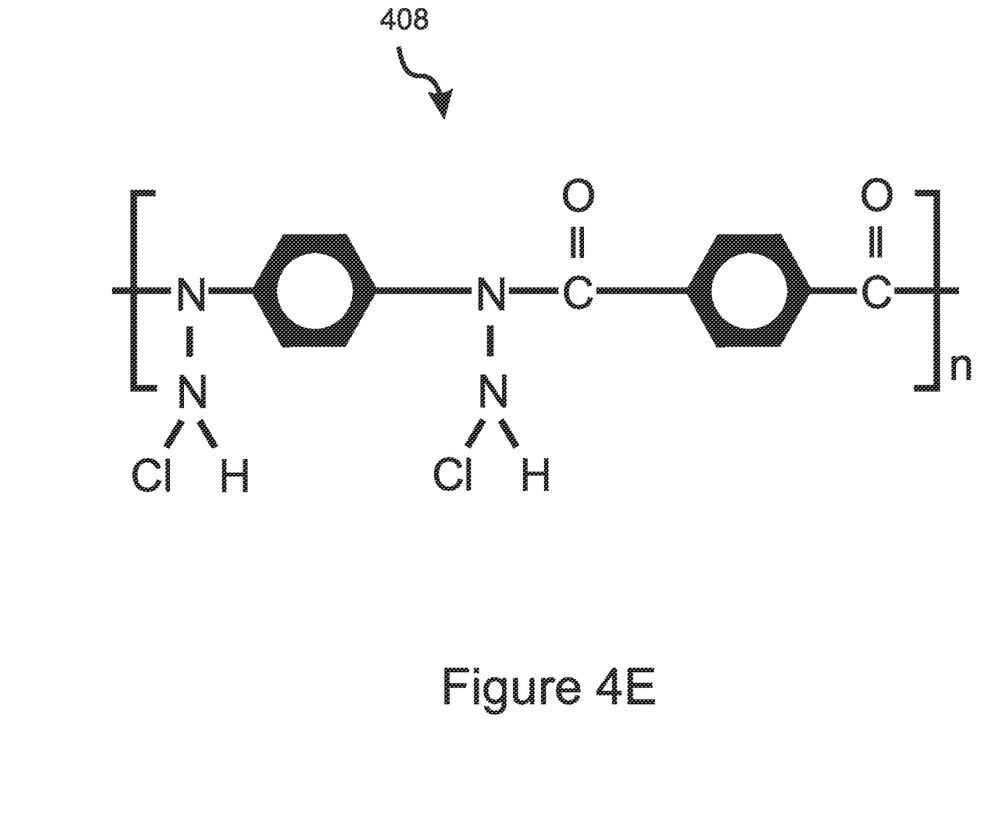
FIG. 4E is a diagram of the meta-aramid polymer of FIG. 4C after exposure to an aqueous $NH_2Cl$ chloramine solution, wherein the N—H groups have been replaced by N—NHCl chloramine groups.

With reference to FIGS. 4C, 4D, and 4E, persistent chemical protection is provided in some embodiments by the bonding of a chlorine atom 406 or of a chloramine group ($NH_2Cl$) 408 to an NH group included in the polymer backbone of a synthetic fiber such as meta-aramid 404.

Figure 5:
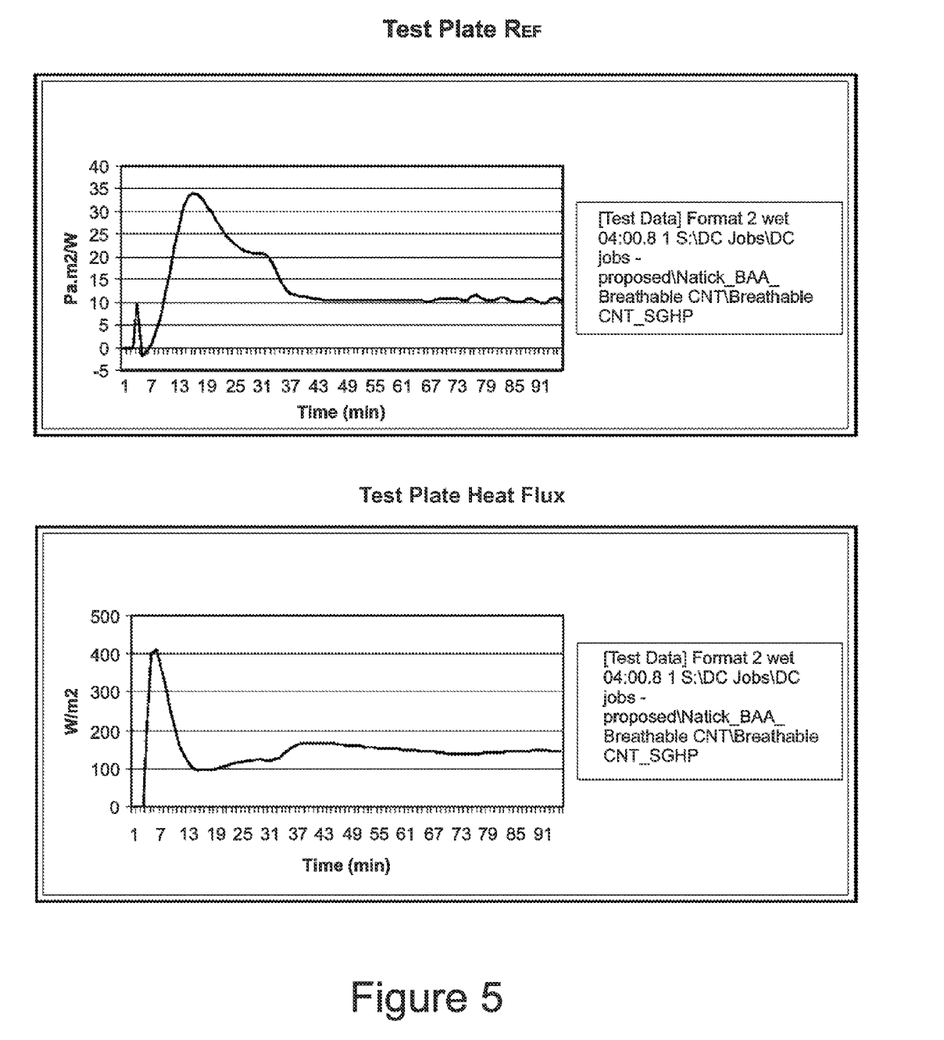
FIG. 5 is a pair of graphs that present test data from an embodiment of the invention.

Some embodiments of the present invention include the following layers:
1. Nomex (flame-resistant meta-aramid)inner liner 1.2 oz/$yd^2$ —knit
2. Adhesive 0.5 oz/$yd^2$
3. CNT felt layer 0.3 oz/$yd^2$
4. Active chemistry wicking layer 2.0 oz/$yd^2$—woven
5. CNT felt 0.3 oz/$yd^2$
6. Adhesive 0.5 oz/$yd^2$
7. Nomex (flame-resistant meta-aramid) outer layer 1.2 oz/$yd^2$—knit One of these embodiments which provides a total system mass of 6.0 oz/$yd^2$ was tested using ASTM 1686 methods. As illustrated by the graphs presented in FIG. 5, the Ret was 19.5 Pa $m^2$/w, the Ref was 10.56 Pa $m^2$/w, and the wet test heat flux was 146 w/$m^2$. This thermal performance is at least comparable to an accepted membrane system, and the heat flux is far in excess of that seen with impermeable systems.

Figure 6A:
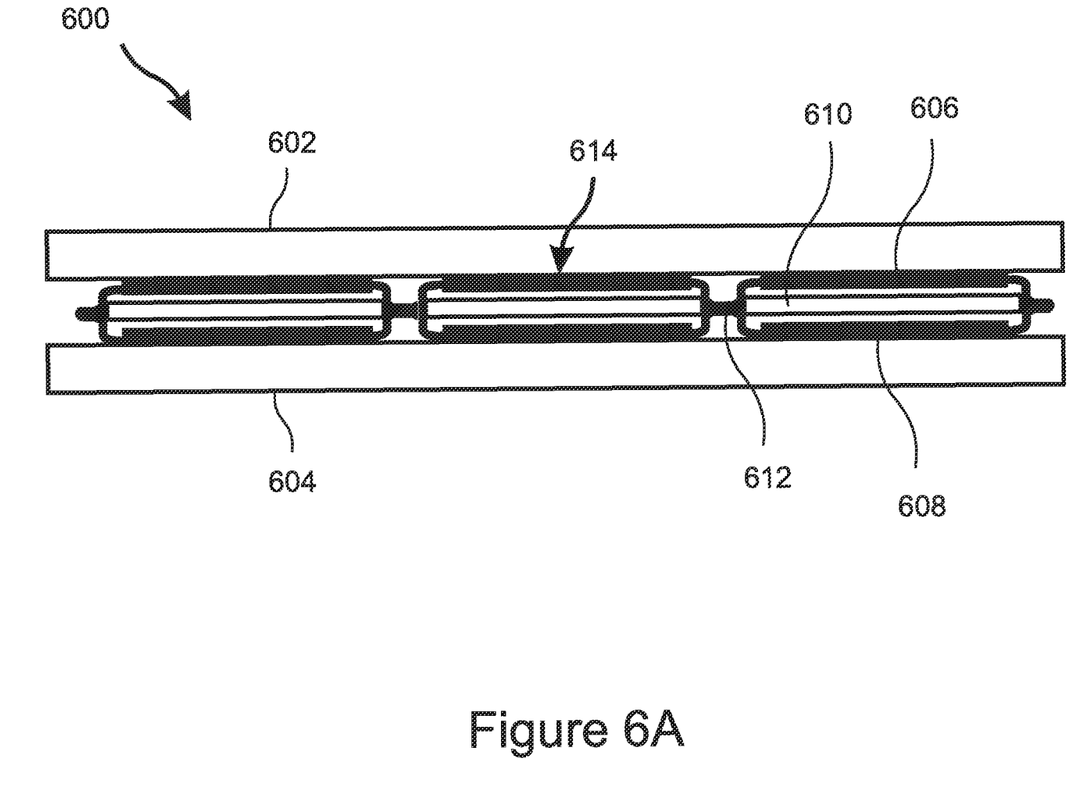
FIG. 6A is a cross-sectional diagram illustrating the structure of an embodiment including air and moisture permeable, chemically reactive CNT/wicking layer cells bounded by fluropolymer seams and sandwiched between an external nylon layer and an inner Nomex (flame-resistant meta-aramid) liner.

The embodiment 600 of FIG. 6A includes an outer layer of Nomex (flame-resistant meta-aramid) or Nylon 602 and an inner liner of Nomex (flame-resistant meta-aramid) 604, whereby these outer 602 and inner 604 layers provide additional structural strength while protecting the interior layers from abrasion. Between the outer and inner Nylon/Nomex (flame-resistant meta-aramid) layers 602, 604 are two CNT felt layers 606, 608 with an active chemistry wicking layer 610 sandwiched therebetween. In this embodiment, the two CNT layers 606, 608 are attached to each other by impermeable fluropolymer seams 612 that enhance flexibility while preventing seam penetration by chemical and biological agents.

Figure 6B:
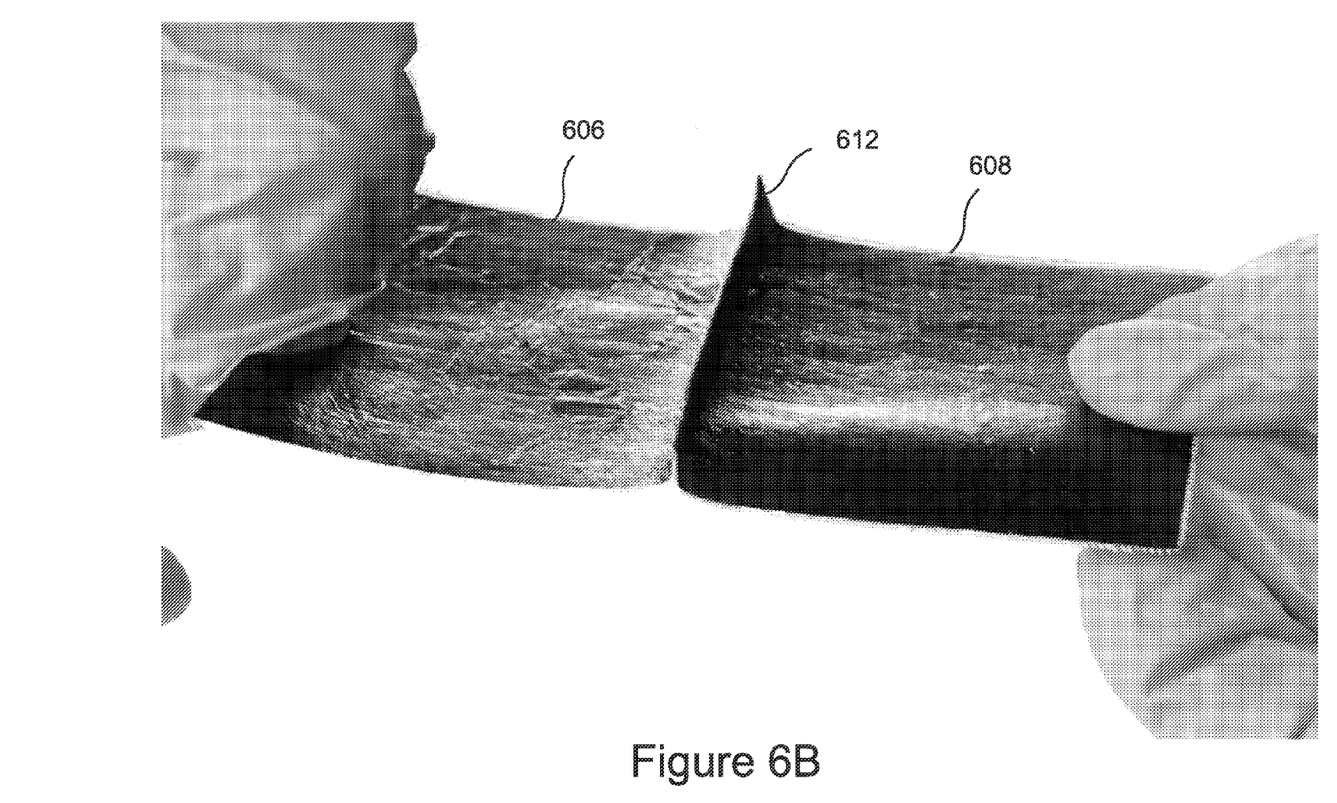
FIG. 6B is perspective view of a fluoropolymer seam formed between two sheets of CNT material.

FIG. 6B is a perspective view of a fluoropolymer seam 612 formed between two sheets 606, 608 of CNT felt. The seams 612 of the embodiment of FIG. 6A and FIG. 6B divide the remainder of the fabric into cells 614 of CNT and wicking textile that provide both physical and reactively chemical CB protection while being air and moisture permeable. As discussed above, in various embodiments reactive chemical protection is provided directly by a chlorinated solution absorbed by the wicking textile 610, and/or by a layer of chloramine 402 formed by exposure of a layer of hydantoin 400 to the chlorinated solution, the layer of hydantoin 400 being applied to the inward-facing surface of at least one of the CNT layers 606, 608 and/or to a surface of the wicking textile 610.

Extremely thin and lightweight CNT felts used in embodiments of the present invention provide a significant advantage over existing impermeable elastomeric or polyethylene laminates, which are bulky and heavy. For example, a standard issue JLIST suit weighs approximately 6 pounds, which equates to about 36 oz/yd$^2$. By comparison, a CB-protective garment made from the CNT reactive cell embodiment 600 illustrated in FIG. 6A weighs approximately between 9 and 12 oz/yd$^2$, including a Nyco or Nomex (flame-resistant meta-aramid) protective shell layer. In contrast with an equivalently sized 6 pound JLIST suit, an entire CNT reactive cell CB-protection suit made using the fabric embodiment 600 of FIG. 6A weighs only between 1.5 and 2 pounds. Perhaps more important is the improved mobility of the user as compared to a user of a JLIST suit, since the present invention is very thin and has excellent flexibility, and the elimination of bulk at the seams 612 reduces chafing and movement restrictions while compromising neither the protection nor the breathability of the embodiment.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A fabric for constructing garments which protect a user from exposure to at least one of toxic chemical droplets and pathogens, the fabric comprising:
    a first physical barrier layer which is able to inhibit penetration by at least one of toxic chemical droplets and pathogens, the first physical barrier layer being a non-woven nanofiber sheet including at least 25% carbon nanotube (CNT) fibers; and
    a wicking textile layer which is physically cooperative with the first physical barrier layer and configured to provide physical support to the first physical barrier layer, the wicking textile layer being configured so as to distribute a reactive chemical throughout the wicking textile layer, thereby forming a reactive chemical barrier layer which is cooperative with the first physical barrier layer; and
    a backing layer cooperative with the wicking textile layer and configured so as to locate the wicking textile layer between the first physical barrier layer and the backing layer.

2. The fabric of claim 1, wherein the nanofiber sheet has a hydrostatic resistance of greater than 3 cm of water column.

3. The fabric of claim 1, wherein the nanofiber sheet has a water vapor transport rate (WVTR) of greater than 0.2 mg/cm2/min.

4. The fabric of claim 1, wherein the nanofiber sheet has a tensile strength greater than 100 g/25 mm/g/m2.

5. The fabric of claim 1, wherein the nanofiber sheet is a CNT sheet including substantially 100% carbon nanotube fibers.

6. The fabric of claim 1, further comprising a second physical barrier layer which is able to inhibit penetration by at least one of toxic chemical droplets and pathogens, the second physical barrier layer being a non-woven nanofiber sheet including at least 25% carbon nanotube fibers, the wicking textile layer being sandwiched between the first physical barrier layer and the second physical barrier layer.

7. The fabric of claim 6, wherein the nanofiber sheet of the second physical barrier layer is a CNT sheet including substantially 100% carbon nanotube fibers.

8. The fabric of claim 1, further comprising a plurality of impermeable seams joining a plurality of first physical barrier layers to the wicking textile layer so as to divide the fabric into separated regions containing physical barrier layers, the separated regions being joined by the impermeable seams.

9. The fabric of claim 8, wherein the impermeable seams are made from a fluropolymer.

10. The fabric of claim 1, wherein the backing layer is a layer of flame-resistant meta-aramid.

11. The fabric of claim 1, wherein the backing layer is a second physical barrier layer which is able to inhibit penetration by at least one of toxic chemical droplets and pathogens, the second physical barrier layer being a non-woven nanofiber sheet including at least 25% carbon nanotube fibers, the wicking textile layer being sandwiched between the first physical barrier layer and the second physical barrier layer.

12. The fabric of claim 11, wherein the second physical barrier layer is a CNT sheet including substantially 100% carbon nanotube fibers.

13. The fabric of claim 1, further comprising a plurality of impermeable seams joining a plurality of first physical barrier layers to a plurality of backing layers, thereby dividing the fabric into a plurality of separated regions in each of which a wicking textile layer is configured between a first physical barrier layer and a backing layer.

14. The fabric of claim 1, further comprising a layer of hydantoin attached to a surface of the fabric and at least in fluid communication with the wicking textile layer.

15. The fabric of claim 14, wherein the layer of hydantoin is applied to a surface of the backing layer.

16. The fabric of claim 14, wherein the layer of hydantoin is applied to the wicking textile layer.

17. The fabric of claim 1, wherein the fabric is included in a chemically and biologically protective garment system, the garment system further comprising:
    a portable container configured for containment of the chemically reactive solution; and
    a solution delivery mechanism which is able to extract the reactive chemical solution from the portable container and deliver it to the wicking textile layer.

18. The garment system of claim 17, wherein the solution delivery mechanism includes at least one of:
   a mechanically operated pump;
   an electrically operated pump; and
   an openable valve.

* * * * *